J. H. STORTZ.
GEAR SELECTING CONTROLLER.
APPLICATION FILED JULY 27, 1914.

1,215,742.

Patented Feb. 13, 1917.
3 SHEETS—SHEET 1.

WITNESSES:

INVENTOR
John H. Stortz
BY
ATTORNEY.

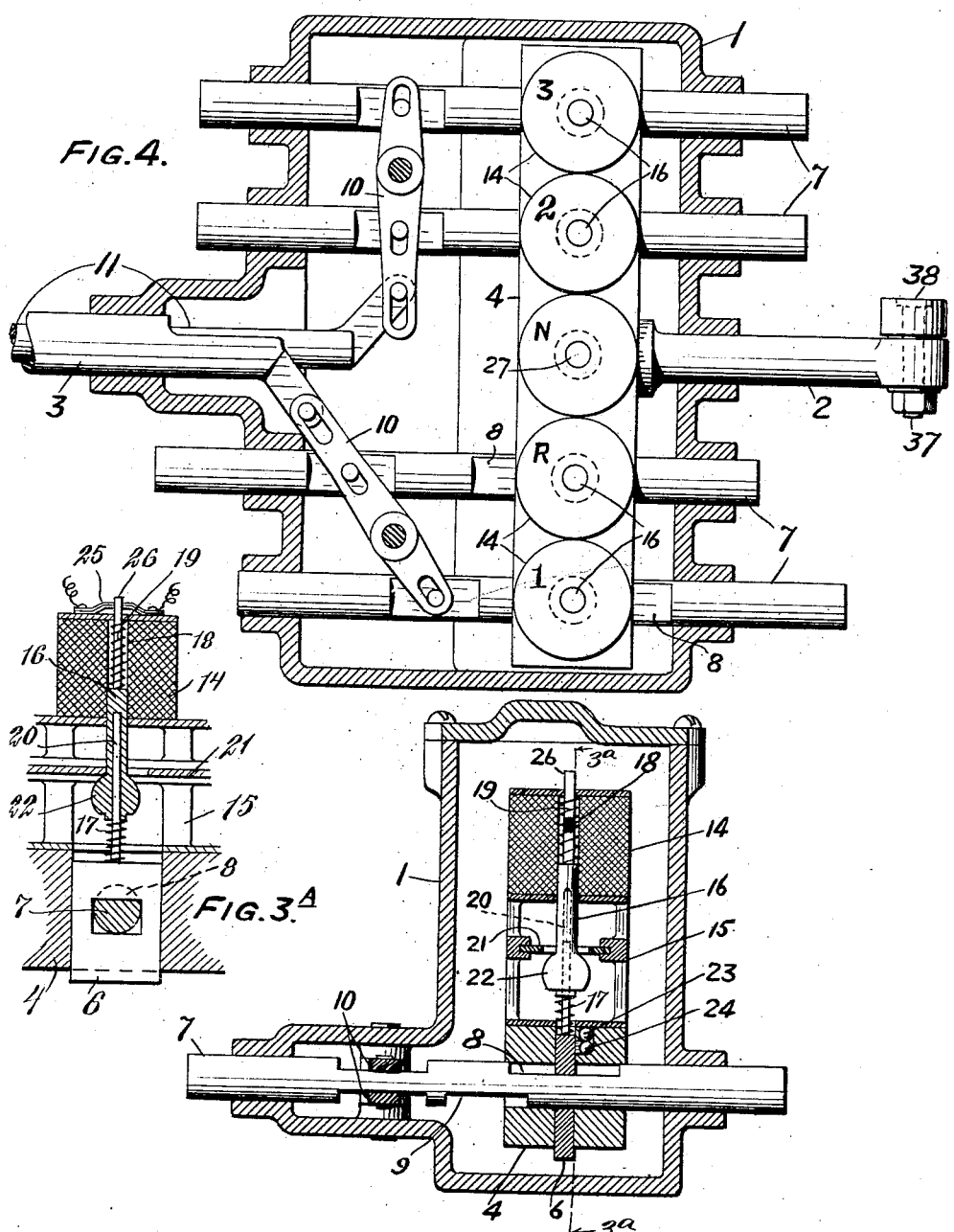

UNITED STATES PATENT OFFICE.

JOHN H. STORTZ, OF PHILADELPHIA, PENNSYLVANIA, ASSIGNOR TO STORTZ GEAR SHIFT COMPANY, OF WILMINGTON, DELAWARE.

GEAR-SELECTING CONTROLLER.

1,215,742. Specification of Letters Patent. Patented Feb. 13, 1917.

Application filed July 27, 1914. Serial No. 853,450.

*To all whom it may concern:*

Be it known that I, JOHN H. STORTZ, a citizen of the United States, and a resident of Philadelphia, in the county of Philadelphia and State of Pennsylvania, have invented certain new and useful Improvements in Gear-Selecting Controllers, of which the following is a specification.

My invention relates to means for selecting the proper combination of gears adapted to produce a change of speed, and especially adapted for use in power driven vehicles.

The chief object of my invention is to select the proper gear electro-magnetically. Another object is to connect one pair of gears and to disconnect another pair of gears electro-magnetically. A further object is to prevent interchange of gears when the power is on. A further object is to disconnect all gears before any other gears are connected.

With these and other objects in view my invention comprises the construction, combination and arrangement of parts hereinafter described, a preferred form of which is illustrated in the accompanying drawings, and embraced within the scope of the appended claims.

Figure 2:
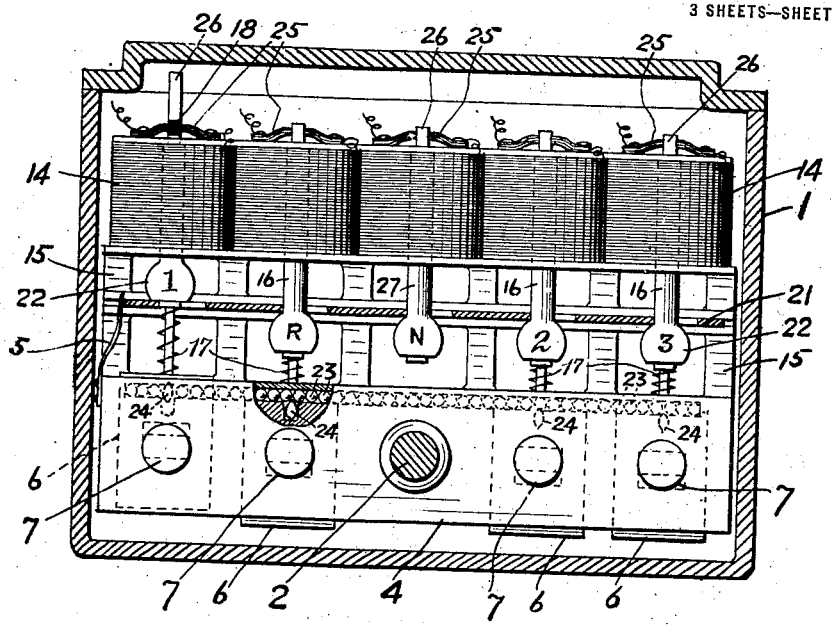
Figure 1:
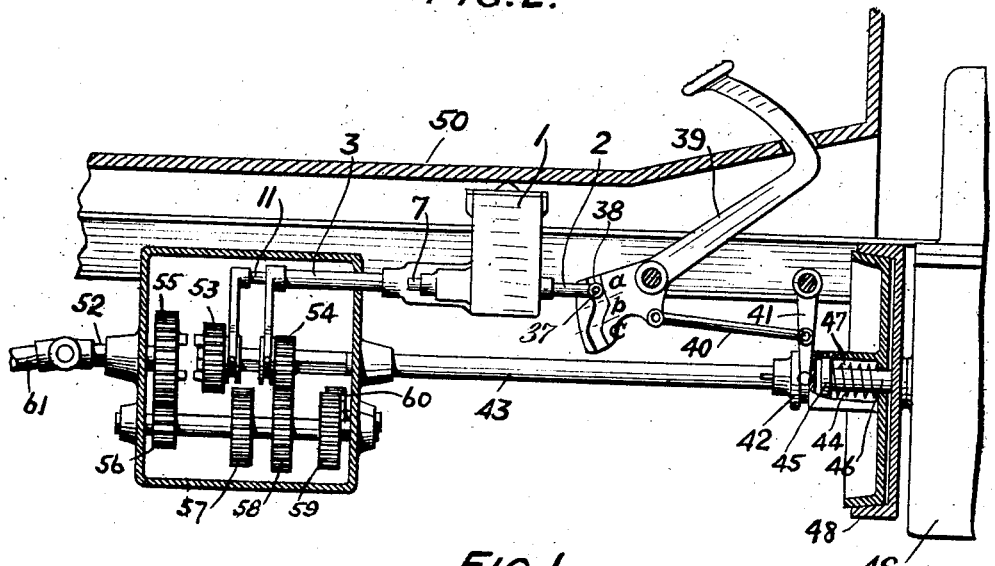
Figure 6:
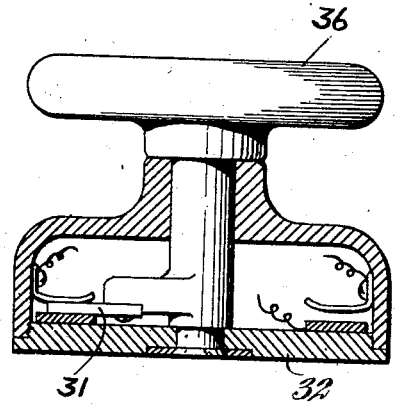
Figure 7:
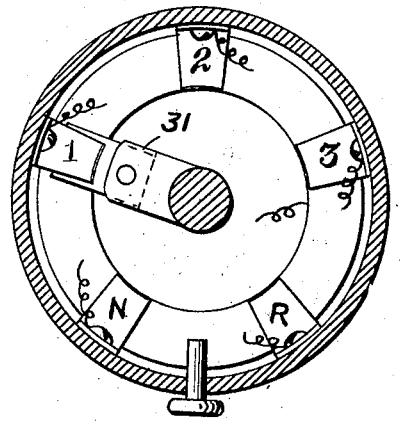
Figure 5:
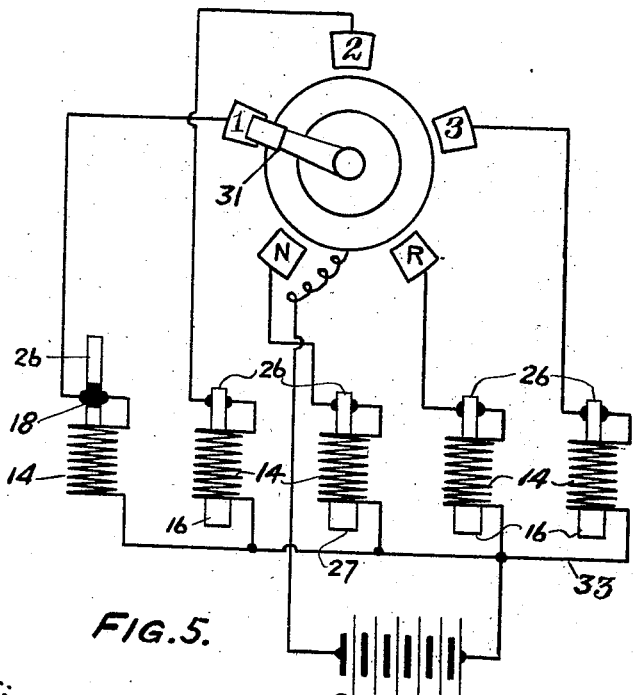

In said drawings, Figure 1 is a side elevation of my controller shown in connection with the central portion of an automobile; Fig. 2 is a sectional elevation of the controller; Fig. 3 is a section of an electro-magnet in connection therewith; Fig. 3ᴬ is a section on the line 3ᴬ—3ᴬ of Fig. 3; Fig. 4 is a plan of a lock in connection with my controller; Fig. 5 is a diagrammatic view of the electric circuits in connection therewith; Fig. 6 is a section of a rheostat in connection therewith, and Fig. 7 is a plan view thereof with the top removed.

Referring more particularly to the drawings for detail description of my invention, 1 represents a controller box provided with bearings for a rod 2 and for a sleeve 3. The rod 2 is rigidly connected with a lock plate 4. The plate 4 is provided with latches 6. Rods 7 are movably supported by said plate each passing through a perforation of a latch. Each rod is provided with oppositely disposed and oppositely extending recesses 8 and 9. The height of the perforation of each latch is equal to the diameter of its rod less the depth of a recess thereof. The rods 7 are arranged in pairs on opposite sides of the sleeve bearing within the box 1. Each pair of rods is pivotally connected by lever 10. A rod 11 is slidingly supported by the sleeve 3. One arm of one of the levers 10 is pivotally connected with a rod 11 and one arm of the second lever 10 is similarly connected with the sleeve 3. The plate 4 carries a series of electro-magnets in alinement with the latches. Each magnet consists of a solenoid 14 wound on a core of a frame 15 and is provided with a plunger 16. Each plunger has one end connected by a spring 17 with a corresponding latch, and the opposite end of the plunger is provided with a circuit breaker 18. A spring 19 is adapted to project said plunger in the direction of its latch. Each plunger is guided by a key 20. Under the key surrounding each plunger is a slide 21 adapted to be moved transversely by knobs 22 of the plungers in opposition to a bar spring 5. Between plate 4 and the magnet frame 15 are mounted a series of balls 23, and each latch is provided with a wedge 24 adapted to separate the balls into two sets every ball of each of said sets being brought thereby in close contact with an adjoining ball.

Each magnet is provided with a pair of brushes 25 adapted to make contact with the conductor ring 26 of a plunger. Centrally between said series of electromagnets, the plate 4 carries an electromagnet, provided with a plunger 27, similar in every respect with the other plungers, except that it has no latch to be operated thereby. A source of electric current 29 has one of its terminals connected with the movable terminal 31 of a rheostat 32 and the other terminal to a conductor 33. Each solenoid has one of its terminals connected with the conductor 33 and the other terminal with one of its brushes, whose opposite brush is connected to a knife blade switch of the rheostat 32. One of said knife blade switches is marked N and is adapted to place in circuit the electromagnet whose plunger is not connected with a latch, the other knife blade switches are marked 1, 2, 3 and R. The movable terminal 31 is adapted to be moved between the plates of the switches by a hand wheel 36.

The rod 2 of the plate 4 carries a pin 37 which supports a roller 38. A lever of the first class 39 is provided with an arm having a recess movably supporting the roller 38. The recess of the arm of said lever consists of cam surfaces over which the roller is adapted to move, said surfaces comprising a curved section $a$ of uniform radius, concentric with the fulcrum of the lever 39 section $b$ of a gradually increasing radius and a section $c$ concentric with section $a$ also of a uniform radius, but of larger radius than that of the section $a$. The lever is also provided with an arm pivotally connected by a rod 40 with a lever of the second class 41. The end of the lever 41 is pivotally connected with a sleeve 42 slidingly keyed on a shaft 43. The sleeve is provided with a recess for a collar 45 and with a bearing for a shaft 46. On the shaft 46 is mounted a fly wheel 44 having a frictional surface adapted to be connected with a clutch 48 of the sleeve 42 by the spring 47. The shaft 46 is adapted to be driven by a motor 49. The lever 39 is fulcrumed on the chassis of an automobile 50 and is provided with a foot pedal above the foot board thereof. A gear chest 51 carried by the chassis is provided with a bearing for the shaft 43 and with a bearing for a shaft 52. On the shaft 43 inside the chest 51 are slidingly mounted gears 53 and 54. On the shaft 52 inside the chest 51 is fixedly mounted a gear 55. Inside of the chest is mounted a countershaft carrying a gear 56 in mesh with the gear 55, a gear 57, a gear 58 and a gear 59 in mesh with an idler 60. The sleeve 3 is provided with a shifter inside the box 51 adapted to shift the gear 54 in mesh with either the gear 58 or with the idler 60. The rod 11 is provided with a shifter adapted to shift the gear 53 either to be connected with the gear of the shaft 52 or in mesh with the gear 57. The shaft 52 is connected by a universal coupling with a shaft 61 adapted to drive the automobile.

The operation is as follows:—Referring to Fig. 1 the clutch is shown connected with the fly wheel whereby shaft 43 is adapted to transmit motion to the shaft 52 by means of the gears 54 and 58 which are shown to be in mesh, and adapted to drive the vehicle on its first speed. To change to the second speed, the controller handle 36 is turned to bring the switch element 31 between the knife blades of the switches marked 2. This establishes a circuit through the solenoid, correspondingly marked in Fig. 4, by way of its brushes 25 and through the conductor ring 26 on top of its plunger, which is correspondingly marked in Fig. 2, and above the insulating ring 18, adapted to break the circuit immediately after a plunger has been pulled upwardly by its solenoid. The circuit through said solenoid causes its plunger to move upwardly forcing its knob through the plate 21 which forces the plate against the spring 5. This permits the knob of the plunger of the solenoid marked 1 to move through said plate compressing the spring 17 thereunder and forcing its wedge 23 from between the adjoining balls. The pedal of the lever 39 is then depressed which causes its arm connected by the rod 40 with the lever 41 to move rearwardly whereby the clutch is disconnected from the fly wheel. During this motion of the lever 39, section $a$ of its cam surface moves over the roller 38 of the rod 2 without transmitting any motion to said rod, as said section is of uniform radius and the distance from the fulcrum of the lever 39 to the center of the roller remains constant. The further movement of said arm causes the section $b$ to move over the roller 38, and as said section is of a constantly increasing radius, the distance from the fulcrum of the lever 39 to the center of the roller increases, and the rod 2 is therefore caused to move rearwardly, which movement is transmitted to the lock plate 4, causing it to move rearwardly with its latches 6. With the gears in mesh, as shown in Fig. 1, and with the controller handle in position marked 2, the latch of the plunger 1 is forced by its compressed spring 17 down into the upper recess 8 of its projecting rod. Any further movement of the lever 39 with its pedal in a downward direction, causes the section $c$ to move over the roller of the rod 2, but as this section is of uniform radius, no further movement is transmitted to rod 2 after said rod had reached its extreme rearward position. The rearward movement of the rod 2 with its plate 4 causes the latch 6 of the plunger marked 1 to slide rearwardly along its rod 7 until it strikes the shoulder of its upper recess 8, and bears against said shoulder to force the rod rearwardly, which rearward movement causes the arm of the lever 10 connected with the sleeve 3 to swing frontwardly and to force said sleeve frontwardly, whereby the gear 54 is forced out of mesh with the gear 58. The rearward movement of the plate 4 also causes all the other latches to move in the same direction, and the latch of the plunger 2 is moved from its position corresponding to that shown in Fig. 3 to a position wherein the rear portion of the upper recess of its rod is directly above the front portion of the lower recess, in which position the spring 17, connecting said latch with its plunger, which was expanded by the upward movement of the plunger, will pull said latch upwardly and into the lower recess and will also force its wedge between a pair of adjacent balls.

When the pedal is released, the clutch spring 44 reverses the movement of the lever 41, which movement is transmitted by the rod 40 to the lever 39 causing its cam arm to swing downwardly. During this downward movement, the roller of the rod 2 is forced off the section $c$ of the cam to roll over the section $b$ and into the section $a$. During the movement of the roller along the section $b$, from its high point where it is connected with the section $c$ to its low point where it is connected with the section $a$, the rod 2 is pulled frontwardly, and the plate 4 connected with said rod is moved frontwardly. The latch 6 of the plunger marked 2, during its frontward movement with the plate 4, bears against the frontward shoulder of the lower recess of its rod 7 and forces said rod frontwardly and causes the arm of the lever 10 which is connected with the rod 11 to swing frontwardly and to force said rod 11 frontwardly. Said frontward movement of the rod 11 is transmitted by the shifter arm connecting it with the gear 53 to force said gear frontwardly until it is in mesh with the gear 57.

To change from the second to the third speed, the controller handle 31 is moved from the position marked 2 on the controller to the position marked 3. This closes the circuit of the solenoid of the plunger marked 3 by way of the brushes 25 and the metallic portion on top of said plunger. The plunger is therefore pulled upwardly until its insulating ring 18 is in position between said brushes when the circuit is immediately broken. During the upward movement of said plunger 3, its knob 22 is forced through the corresponding perforation of the slide 21, whereby said slide is forced from under the knob of the plunger marked 2. This releases said plunger 2 to be forced downwardly with its knob by its spring 19. When the knob of the plunger 3 is above the slide and the knob of the plunger 2 below the slide, the slide is free to be forced by the spring 5 into its original position, wherein it supports the plunger 3, to prevent it from being forced downwardly by its spring 19 upon the breaking of the circuit of its solenoid. The latch of the plunger 3 being in the position corresponding to that of Fig. 3 cannot as yet be pulled upwardly, its spring 17 connecting it with its plunger is therefore expanded and placed under a tension. As the plunger 2 is being forced downwardly, it bears against the stem of its latch along its keyway 20 and forces the wedge of the latch from between the adjacent balls and the latch is moved outwardly of the lower recess of its rod 7 and within the upper recess. When the pedal is now depressed, the rod 2 moves rearwardly with the plate 4. This causes the latch of the plunger 3 to slide rearwardly on its rod 7 until it is in alinement with the lower recess, while the latch of the plunger 2 bears against the shoulder of the upper recess of its rod. This causes the rod of the latch of the plunger marked 2 to move rearwardly and to swing the arm of the lever 10 connected with the rod 11 to swing rearwardly, whereby the gear 53 is forced rearwardly out of mesh with the gear 57 and into its neutral position. When the latch of the plunger 3 is in alinement with the lower recess of its rod 7 it is pulled upwardly by its spring 17 and its wedge is forced between a pair of the adjacent balls to prevent the accidental displacement of any of the other latches. If the pedal is now released, the rod 2 will move frontwardly with the plate 4, and the latch of the plunger 3 will bear against the shoulder of the lower recess of its rod and force said rod frontwardly. The frontward movement of this rod will cause the lever to swing with its arm connected with rod 11 farther rearwardly, and the gear 53 will be forced rearwardly from its neutral position until it becomes connected with the gear 55.

To reverse the machine, the controller handle is moved into a position of alinement marked R. This closes the circuit of the solenoid of the plunger marked R. Said plunger is therefore pulled upwardly with its knob, causing the slide 21 to release the plunger marked 3 which is thus free to be forced downwardly by its spring 19. The downward movement of the plunger 3 forces its latch outwardly of the lower recess of its rod 7 and its wedge from between the adjacent balls. If the pedal be now depressed, the rod 2 will be moved rearwardly with the plate 4, and the latch of the plunger 2 will, during said rearward movement, force its rod 7 rearwardly, and the connecting arm of the lever 10 will cause the rod 11 to move frontwardly. The frontward movement of the rod 11 is transmitted to gear 53 by the shifting arm of said rod to move said gear frontwardly away from the gear 55 and into its neutral position. If the pedal be now released, the latch of the plunger marked R, which is now engaged with the shoulder of the lower recess of its rod 7, will force said rod frontwardly and cause the arm of the lever 10 connecting it with the sleeve 3 to swing frontwardly. The sleeve 3 will thus be moved frontwardly and force the gear 54 from its neutral position into mesh with the idler of the gear 59.

To stop the car, the controller handle is moved in alinement with the position marked N on the controller. This closes the circuit of the solenoid of the plunger marked N. As the plunger is being pulled upwardly, it causes the slide 21 to release every other plunger, which in this case happens to be the one marked R. The latch of the plunger R is thereby forced out of the lower recess of its rod 7 and its wedge from between the adjacent balls. If the pedal be now depressed the latch of the plunger R, which now bears against the shoulder of the upper recess of the rod 7, forces said rod rearwardly, and the arm of the lever 10 connecting it with the sleeve 3 is caused to swing rearwardly and to move the sleeve 3 rearwardly, which rearward movement is transmitted to the gear 54 whereby it is forced out of mesh with the idler 60 and into its neutral position. If the pedal be now released, the latch of the plunger marked R will move frontwardly along its rod 7 and its upper recess, and as the plunger marked N has neither a latch nor a wedge, the gears will remain in their neutral positions, and the balls 23 will be free to be wedged for holding up a latch when the controller handle is moved in position to select the gear for starting the car.

To start the car on the first speed, the controller handle is moved from its position on the controller marked N into the position marked 1, and by depressing the pedal the latch of the correspondingly marked plunger is slid rearwardly on its rod 7 in conjunction with all the other latches, which are in a corresponding position when the gears are in a neutral position, and when said latch is in alinement with the rearward portion of the lower recess below the rearward portion of the upper recess it is pulled upwardly by its spring 17. When the pedal is released the said latch of the plunger marked 1 bears against the shoulder of the lower recess of its rod 7 and carries said rod frontwardly. This causes the lever 10 to swing with the arm connecting it with the sleeve 3 rearwardly, and the gear 54 is forced rearwardly of its neutral position and into mesh with the gear 58.

To start the car from rest on its reverse, the controller handle is moved from the position of the controller marked N into the position marked R. When the pedal is depressed, the latches of all the plungers are moved rearwardly until they are in alinement with the overlapping portions of the upper and lower recesses of the rods 7, but as only the latch of the plunger R is now pulled upwardly, it alone will be in position to force its rod frontwardly when the pedal is released, which frontward movement will cause the lever 10 connected with the sleeve 3, to actuate the gear 54 from its neutral position into mesh with the idler 60 of the gear 59.

While the arrangement shown is thought, at the present time, to be preferable, it is desired to reserve the right to effect such modifications and variations thereof as may come fairly within the scope of the appended claims.

Having thus described my invention, what I claim as new and desire to protect by Letters Patent is—

1. In a gear selecting controller, a lockplate and rod supported by said plate, a gear shifter, a lever connecting the rod with said shifter, a latch adapted to lock the plate with the rod, and an electromagnet adapted to operate the latch, for the purposes set forth.

2. In a gear selecting controller a lock comprising a plate, a rod and a latch, and an electro-magnet adapted to operate the latch whereby the plate becomes operatively connected with the rod.

3. A gear selecting controller, comprising a gear shifter, lever adapted to operate the shifter in opposite directions, rods adapted to operate the lever, each rod provided with a pair of recesses, a latch for each rod, and an electro-magnet for each latch adapted to force the latch out of one recess of a rod and into another recess of said rod.

4. A gear selecting controller, comprising a gear shifter, two rods movable in opposite directions adapted to operate the shifter, each rod provided with a pair of recesses, a latch for each rod, an electro-magnet adapted to cause the latch to alternately move into one of said recesses and out of the other, a switch to establish a circuit through the electro-magnet, and a circuit breaker adapted to open the circuit independently of the switch.

5. A gear selecting controller, comprising a shifter, operating rods therefor, each provided with two recesses, a latch for each rod, a plate carrying the latches, a horizontal series of loosely mounted balls, and adapted to be wedged by a latch, an electromagnet for each latch adapted to move the latch out of one recess of a rod so as to cause it to wedge the balls and to move it out of said recess to cause it to unwedge the balls.

6. A gear selecting controller, comprising a shifter, operating rods therefor, each provided with two recesses, a latch for each rod, a plate carrying the latches, an electrorod, a plate carrying the latches, an electromagnet for each latch, a plunger spring connected with a corresponding latch and provided with a knob, a plate through which the plunger is adapted to move through with its knob, a spring adapted to force the plate to support the plunger under the knob, a series of balls between the latch plate and the magnet adapted to be wedged by the movement of a latch into one recess of a rod and unwedged by its movement out of said recess, means for establishing a circuit through each electro-magnet whereby its plunger is projected forwardly, which circuit is broken by the said upper movement.

7. A gear selecting controller, comprising gear shifters, a pair of rods for each shifter, a latch for each rod, a plate carrying the latches, an electromagnet for each latch, a plunger for each electro-magnet provided with a circuit breaker, means for establishing a circuit through each magnet, whereby its plunger is pulled up whereupon the circuit is broken by the circuit breaker, means for holding each plunger in said elevated position when the circuit is broken, and an electro-magnet adapted to release the holding means.

8. In a gear shifting mechanism, a shift rod, a plurality of locks carried by said rod, shifters, means for operating the locks to selectively connect the shifters with the rod, and a lever provided with a cam adapted to move the rod longitudinally of the shifters in opposite directions with an intermission of rest during the change of direction.

9. In a gear shifting mechanism, a shift rod, a lever provided with a cam adapted to move the rod longitudinally in opposite directions, a plurality of locks carried by said rod, shifters, and a gear selecting controller adapted to actuate the locks to selectively connect the rod with the shifters before the cam is actuated to reciprocate the rod.

10. The combination of driven and driving gears, shifters adapted to operate the driving gears to cause any one of them to become disconnected from a driven gear and connect another driving gear with said driven gear, a clutch adapted to transmit power to the driving gears, a manually operated lever provided with an arm adapted to operate the clutch and with a cam to operate the shifters, said cam being adapted to cause the rod to move longitudinally of the shifter in opposite directions and to actuate the shifters to disconnect a driving gear from a driven gear and to connect another driving gear, said interchange taking place after the operation of the clutch to prevent the transmission of power to the driving gear, and a controller adapted to establish a selective operative connection between the rod and the shifters before the clutch is operated either to prevent or to cause transmission of power to a driving gear.

11. In a gear shifting mechanism, the combination with a shift rod, and two members movable relatively to the shift rod in opposite directions, of means for connecting said rod to the said members, means for preventing the connection of the said parts, and electrical means for selectively controlling the said preventing means.

12. In a gear shifting mechanism, the combination with a shift rod, and two members movable relatively to the rod in opposite directions, of means carried by the rod for connecting it to the said members, and electrical means for selectively controlling the said connecting means.

13. In a gear shifting mechanism, the combination with a shift member, and two members movable relatively to the shift member in opposite directions, of means for connecting the latter members with the shift member, and electromagnets for selectively controlling the said connecting means.

14. In a gear shifting mechanism, the combination with a stationary part, a shift member, and two members movable relatively to the shift member in opposite directions, of means for connecting the latter members to the shift member, electromagnets carried by the shift member for operating the connecting means, and means carried by the stationary part for selectively controlling said electromagnets.

15. In a gear shifting mechanism, the combination with a shift rod, and two members movable relatively to said rod in opposite directions, a series of electromagnets carried by said rods provided with means for connecting it with said members, means for selectively closing the circuits of said electromagnets, and means for breaking the circuits carried by the connecting means.

16. A gear shifting mechanism, comprising selectively operable gear shifters, electric means for selecting the shifters, means for controlling the circuits of said electrically operated selected means, and switch adapted to break the circuits immediately after each selection.

17. A gear shifting mechanism, comprising selectively operable gear shifters, electric means for preselecting the gear shifters, and means for causing a current to flow for only that length of time necessary for the selecting means to change from any one selection to any other.

18. In a gear shifting mechanism, the combination with a shift rod, and a member movable longitudinally of the rod, actuating means carried by said rod normally adapted to connect said rod with said member to actuate said member from an inactive to an active position, and means adapted to prevent the connection of the actuating means with a member.

19. A gear shifting mechanism comprising, in combination with the driven, transmitting and driving elements of a machine, wherein the transmitting element is normally connected with a driving element, means for shifting the transmitting elements, a member movable longitudinally of said shifting means, means for connecting said member to said shifting means, means adapted consecutively to cause a disengagement of the transmitting element with the driving element, a movement in one direction of the member to cause the shifting means to disengage the transmitting element from the driven element, and a movement in opposite directions of the member to cause the shifting means to engage different transmitting elements with the driven element.

20. In a gear shifting mechanism, the combination with gear shifters, a shift rod, means adapted to actuate each shifter in opposite directions, and means adapted to move the actuating means longitudinally of the rod in opposite directions.

21. In a gear shifting mechanism, a shift rod, a reciprocable member, a shift means normally adapted to connect the reciprocable member with the shift rod, and means adapted to prevent said connection.

22. In a gear shifting mechanism, a shift rod, a member movable longitudinally of the rod in opposite directions, engaging means for connecting the rod with the member to move the rod into an operative position, engaging means for connecting the rod with the member to move said rod into a neutral position, and means for selecting the beforementioned engaging means.

23. In a gear shifting mechanism, shifters, a plurality of means for actuating said shifters, means for establishing a connection between the actuating means and the shifters, a plurality of means for preventing said connection corresponding in number to the number of the actuating means, and means for selecting the preventing means.

24. In a gear shifting mechanism, the combination with shifters, actuating means therefor, connecting means normally active to connect the shifters and actuating means, supporting means to each connecting means adapted to support the connecting means in an inoperative position, and selecting means whereby only one connecting means may be operated at any one time.

25. A speed selector comprising, in combination with the transmitting elements of a speed changing device, shifters adapted to selectively reciprocate the transmitting elements, a pair of actuating members to each shifter, means connecting the actuating members with a shifter to reciprocate it, a shift rod, means for selectively connecting said rod with the actuating members to cause a pair of said members to move simultaneously in opposite directions.

26. In combination with the shifters of a machine provided with speed changing devices, members operatively connected with the shifters, means for actuating each member in opposite directions, means for preventing the connection between the actuating means and said members, and means adapted to selectively operate the said preventing means.

In testimony whereof I have signed this specification in the presence of two subscribing witnesses.

JOHN H. STORTZ.

Witnesses:
 HELEN M. BAKER,
 CATHERINE C. SNYDER.